United States Patent [19]

Dziondziak

[11] Patent Number: 4,882,177
[45] Date of Patent: Nov. 21, 1989

[54] METHOD FOR THE PRODUCTION OF ALCOHOL-FREE BEER

[75] Inventor: Klaus Dziondziak, Pinneberg, Fed. Rep. of Germany

[73] Assignee: Holsten-Brauerei AG, Hamburg, Fed. Rep. of Germany

[21] Appl. No.: 47,467

[22] Filed: May 11, 1987

[30] Foreign Application Priority Data

May 13, 1986 [DE] Fed. Rep. of Germany ....... 3616093

[51] Int. Cl.$^4$ ............................................. C12C 11/00
[52] U.S. Cl. ....................................... 426/14; 426/16; 426/29; 426/475; 426/592
[58] Field of Search ................... 426/7, 14, 16, 28, 29, 426/474–477, 592, 487, 490, 488

[56] References Cited

U.S. PATENT DOCUMENTS

| 613,915 | 11/1898 | Uhlmann | 426/14 |
| 1,017,086 | 2/1912 | Deckebach | 426/14 |

FOREIGN PATENT DOCUMENTS 0014340  8/1980  European Pat. Off. ............. 426/14

Primary Examiner—Marianne Cintins
Attorney, Agent, or Firm—Birch, Stewart, Kolasch & Birch

[57] ABSTRACT

The object of the invention is to provide a method for the production of low-alcohol or alcohol-free beer. In said method, a gas is lead through alcoholic beer in order to desorb the alcohol, the involved loss of taste in the beer being compensated for by substances which improve the taste thereof. The taste-improving substances are either already contained in the beer as fermentable substances or are specifically added thereto. The method of the invention can also be carried out using yeast-containing beer, the yeast then utilizing a portion of the fermentable substances present, producing aroma substances typical of beer and, if necessary, degrading a further portion of the present ethanol at the same time.

17 Claims, No Drawings

METHOD FOR THE PRODUCTION OF ALCOHOL-FREE BEER

FIELD OF THE INVENTION

The invention relates to a method for the production of low-alcohol or alcohol-free beer.

BACKGROUND OF THE INVENTION

There are already several methods known for the production of low-alcohol or alcohol-free beer. For this purpose, at least a portion of alcohol is removed from beer produced according to conventional brewing processes and having a normal alcohol content. In the method disclosed in the DE-A-14 42 238, alcohol is evaporated in a thin layer-evaporator at a temperature of under 70° C. In the similar method known from the DE-A-12 66 266, beer is firstly subjected to atomisation evaporation in a vacuum and then to thin layer evaporation in a vacuum. The residuals are reblended and impregnated with carbonic acid (carbon dioxide).

Furthermore the DE-A-24 05 543 and the DE-A-721 249 describe methods for the adsorptive alcohol removal from beer. A method for the production of low-alcohol beer by reverse osmosis is disclosed in the DE-A-23 23 094. Finally, methods have been proposed in which the alcohol is distilled off in a brewing pan.

On the other hand, methods for the production of low-alcohol or alcohol-free beer have been developed in which the production of alcohol during the production process is reduced from the very beginning. This is achieved either by using yeast that can only partially ferment wort or by repressing or interrupting fermentation; cf. DE-A-520 363 and DE-A-728 871.

All the above methods have the disadvantage that the taste of the low-alcohol or alcohol-free beer obtained thereby is not as good as that of normal alcoholic beer. Beer which is dealcoholised after production is dull and inharmonious in taste, whereas beer in which the production of alcohol is prevented or reduced from the very beginning has the typical, unpleasant taste of wort. It has also been found that the dealcoholisation methods used entail rather high expenditures and are troublesome.

SUMMARY OF THE INVENTION

It is the object of the present invention to provide a method for the production of low-alcohol or alcohol-free beer, according to which low-alcohol or alcohol-free beer with a satisfactory taste can be obtained. It is a further object of the present invention to provide a method for the production of low-alcohol or alcohol-free beer which can be carried out continuously, is not prone to disturbances and gives low-alcohol or alcohol-free beer with a satisfactory taste.

Surprisingly, it is possible to reach these objects by removing the alcohol from alcoholic beer via the process of desorption using a gas. According to the invention, the involved loss of taste in the beer is compensated for by substances which improve the taste thereof.

The treatment disclosed in the method of the invention is an aerobic process which can be carried out on yeast-free beer. In a specific embodiment, the beer subjected to alcohol-desorption treatment may contain yeast. Due to the aerobic metabolism of yeast, part of the alcohol present is used up. Furthermore, the detrimental effects of the oxygen optionally used during the desorption process are compensated for by the reducing effect of the yeast.

The subject matter of the invention, therefore, is a method for the production of low-alcohol or alcohol-free beer which is characterised in that a gas is lead through alcoholic beer in order to desorb the alcohol, the involved loss of taste in the beer being compensated for by substances which improve the taste thereof.

According to a second embodiment of the invention, there is provided a method for the production of low-alcohol or alcohol-free beer which is characterised in that a gas is lead through a yeast-containing, alcoholic beer in order to desorb the alcohol, the loss of taste in the beer being compensated for by substances which improve the taste thereof.

The yeast, which may be optionally present in the beer during the process of desorption, utilises a portion of the optionally present fermentable substances, thereby producing aromatic substances typical of beer. At the same time, said yeast degrades a further portion of the ethanol present.

DETAILED DESCRIPTION OF THE INVENTION

In compliance with the relevant German regulations, "low-alcohol" beer is such that has an alcohol content of 0.5 to 1.5 % by weight and "alcohol-free" beer such that has an alcohol content of under 0.5, preferably under 0.1, most preferably under 0.05 % by weight (detection limit).

In the method of the invention, a gas is lead through an alcoholic beer in order to desorb the alcohol therefrom. The desorption of the alcohol is effected in the fashion of a two-phase distillation process.

In the method disclosed in the invention, it is possible to use air, for instance, in order to desorb the alcohol. Surprisingly, it has been discovered that the oxygen contained in the air does not impair the quality of beer provided that one keeps within certain limits of the conditions of the treatment.

In addition to air, carbon dioxide and other inert gases can also be used as treatment gases in the method of the invention.

In the method according to the invention, desorption treatment is carried out at a temperature of 15° to 50° C., preferably 20° to 40° C. and most preferably 25° to 35° C. The duration of the treatment depends on the temperature and the design of the apparatus. Under technically effective conditions, the treatment lasts for at least 1 minute, in continuous methods preferably 5 to 20 minutes, most preferably 10 to 15 minutes. In discontinuous methods, the treatment usually lasts longer, for instance 45 to 180 minutes.

The loss of taste in the beer which occurs during desorption treatment is compensated for in the invention by substances which improve the taste of beer. Said substances can either already be present in the beer to be treated or can be specifically added thereto. Thus, in the method of the invention, it is possible, for instance, to use partially fermented alcoholic green beer which still contains a residual amount of fermentable substances.

These substances can either compensate for the sensoric deficit themselves or they are converted into beer-typical aromatic substances by the metabolism of the yeast - provided that the method is carried out in the presence of yeast.

In another embodiment, the alcoholic beer subjected to treatment can be completely fermented beer to which fermentable substances are specifically added. This addition of the taste-improving substances can be carried out either before, during or after desorption treatment in the method of the invention. Special examples of suitable fermentable substances which improve the taste of beer are wort, krausen or sugar. The addition of krausen is particularly preferred. In a particularly favourable embodiment, krausen is added to the alcohol-free beer after the desorption treatment.

If beer containing a residual amount of fermentable substances is subjected to the treatment according to the invention, or if fermentable substances are added to the beer before or during the treatment, the content of such fermentable substances in the beer should be 0.25 to 2.0 % by weight, preferably 0.25 to 1.8 % by weight, most preferably 1.2 to 1.75 % by weight. In the presence of yeast, the aerobic treatment does not lead to the yeast completely utilising the fermentable substances; the treatment is far more carried out until the residual content of the fermentable substances is 1.2 to 1.75 % by weight, preferably 1.4 to 1.7 % by weight. It has been found to be of particular advantage if the treated beer contains or has added to it the substances which are to compensate for the loss of taste in the beer and are to improve the taste thereof to such an extent that an increase in the extract content of the treated beer of 0.3 to 2.0 by weight, preferably 0.8 to 1.8 by weight and most preferably from 1.2 to 1.7 % by weight in comparison to the extract content of the original beer is achieved.

In a preferred embodiment, a steam-saturated gas is used to desorb the alcohol. This leads to the selective absorption of alcohol from the beer, but of no water and almost no sensorically relevant substances. In a further, preferred embodiment, the gas, preferably air saturated with steam, which is used to desorb the alcohol, is recirculated for the further desorption treatment of the beer. This has the advantage that the recirculated gas can also be saturated or enriched with the volatile aromatic substances of the beer. Thus the further desorption of these desired substances from the beer is reduced. The alcohol can be removed from the recirculated gas via cold drying or other conventional processes. Further, beer-typical aromatic substances can be added to the recirculated gas. This step prevents the undesired desorption of aromatic substances from the beer.

The main cause for the loss of taste in the beer is the removal of alcohol. In order to compensate therefor, the method of the invention suggests adding substances to the beer which improve the sensoric qualities (taste and smell) of beer. Krausen is the preferred taste-improving substance. It is a lightly fermented wort having an average real degree of fermentation of 1 to 35 %. In the method of the invention, the krausen used has a degree of fermentation of 4 to 25 %, preferably 6 to 8 %.

In an embodiment, the method of the invention can be carried out using beer which contains yeast. The yeast can be specifically added to the beer for this purpose. It is also possible to use beer which contains residual amounts of yeast from the process of fermentation, e.g. beer which has been fermented and is now being stored (storage cellar beer). The amount of yeast used is not critical; 20 to $40 \times 10^6$ cells/ml are preferred. The storage cellar beer preferably used has a content of, for instance, 0.5 to $2 \times 10^6$ cells/ml.

The partial metabolism of the fermentable substances caused by the yeast produces aromatic substances typical of beer which compensate for the deficit in taste resulting from the degradation or evaporation of the ethanol. This is of particular significance when the fermentable substances are wort or sugar. In contrast, when the fermentable substance is krausen, the metabolic production of beer-typical aromatic substances by the yeast does not play so large a role, as said krausen already contains the beer-typical aromatic substances required.

Accordingly, in an embodiment of the method according to the invention, the aerobic treatment of the alcoholic beer can be carried out in the presence of yeast but without fermentable substances. This is due to the fact that the aromatic substances typical of beer and desirable for the full-bodied taste of the low-alcohol or alcohol-free beer to be produced are already contained in the krausen and thus, when using the same, said aromatic substances pass into the beer after the aerobic treatment has been carried out.

The kind of yeast used in the aerobic treatment is of no special importance. However, the yeast must be viable at the chosen treatment temperature. It should nevertheless be mentioned that in comparison to fermentation, the treatment is to be carried out in a relatively short period of time. As a rule, yeast does not die off immediately at elevated temperatures. This means that the yeast used in the method according to the invention must be able to stand up to the chosen treatment temperature at least for a certain amount of time.

In the method of the invention, yeast of the genus Saccharomyces and preferably of the species Saccharomyces rouxii can be used. The yeast strains S. rouxii DSM 2531 and DSM 70535 have proved successful.

The method of the invention can be carried out in a reactor. The reactor can be an open vat, but should preferably be a vessel which meets common standards of hygiene; its interior may not contain condensation areas for the liquid contained in the air flowing through the vessel. The reactor can also be a closed system in which the gas flowing through said system is continuously freed from the liquid contained therein via an appropriate drying system (e.g. cold drying). The use of a sieve plate column is particulary preferred.

If an appropriate air distribution system of the known kind is being used, then the reactor should guarantee a favourable surface/volume ratio. Although said ratio can be greatly varied according to the amount of air introduced, the liquid level in the reactor should not exceed 100 mm, preferably 35 mm, in order to avoid excessive turbulence and formation of foam. In a reactor of this kind, the treatment is preferably between 45 and 180 minutes.

The amount of air required depends on the temperature, the filling level of the reactor and the humidity content of the air before and after it has flown through the liquid layer.

For reasons already mentioned, it is more sensible to work with low filling levels of liquid. Under industrial conditions, it is therefore recommendable to arrange a battery of such flat-bedded reactors on top of one another, as filling levels of 100 mm can be deposited in reactors which have a total height of no more than 200 to 300 mm each.

A further possibility for carrying out the process is the use of continuous reactor systems of the known kind in which air and liquids are introduced according to the countercurrent method. Preferably, the thus treated beer is then immediately cooled down to storing temperature, is rediluted and is then immediately washed with $CO_2$ in order to remove any residual oxygen, is recarbonised and stored in a cool place for several days in order to subject it to further treatment in a manner common in the production of beer. Carrying out the process in this way and combining aerobic treatment using yeast which increases its metabolism of ethanol under these conditions and does not produce any flavourings or odorous substances atypical of beer, in particular yeast of the variety Saccharomyces, preferably S. rouxii, most preferably the DSM-strains 2531 and 70535, with cold storage for several days guarantees almost complete compensation for the beer-typical aroma substances and flavourings lost during the process of evaporation.

A clear definition of the aroma substances and flavourings typical of beer is given in the known scientific literature (Narziβ, L., Abrib der Bierbrauerei, publisher F. Enke, Stuttgart, 1980; Jager, P., Mitteilungen der Versuchsstation fur das Gärungsgewerbe in Wien, No. 9/10, 1983, pp. 100 to 106, No. 11/12, pp, 130 to 133, No. ½ 1984, pp. 4 to 8, No. 3/4, pp. 43 to 46).

In order to produce low-alcohol beer according to the invention, one can blend the obtained alcohol-free beer with normal beer until the desired concentration of alcohol is reached. It is, however, also possible to interrupt the method as soon as the aerobically treated beer attains the alcohol content desired.

The low-alcohol or alcohol-free beer produced according to the method of the invention was tasted several times by an expert taste panel and judged to be absolutely equivalent to the comparison beer, i.e. beer of the Pilsner type. It was furthermore judged to be highly superior to other kinds of low-alcohol beer commercially available. Whereas the character of the latter was found to be atypical of beer, the beer produced according to the method of the invention proved to be typical of and identical to beer.

The following are examples which describe in detail preferred embodiments of the method according to the invention.

EXAMPLE 1

In a continuous method, completely fermented Pilsen beer is dealcoholised in a sieve plate column and its taste harmonised. It is found that continuous operation not only significantly cuts apparatus expenditure, but also leads to shorter reaction times for comparable throughputs as against reactors which are operated intermittently.

(a) Structure and Mode of Operation of the Continuous Pilot Plant

The central unit of the plant is a sieve plate column with five ceramic sieve plates and two lateral inflows, i.e. overflows. In the vicinity of the sieve plate, the column has a cylindrical shape which becomes conic below the air inflow connection piece.

The diameter is 150 mm and the distance between each column plate 200 mm. The overall height is 1.750 mm. Each sieve plate has approx. 85 round sieve openings of a diameter of approx. 3 mm. Each overflow is positioned at a height of approx. 2 mm above the sieve plate. The column with the measuring devices (flow meter for air and liquid) hangs in a tubular steel frame.

The air is supplied via a ventilator and is lead via an electric heating device to arrive laterally under the lowest column tray (connection power 2.5 kW). The beer to be treated is lead out of a storage-pressure tank under $CO_2$-pressure onto the upper column tray via the upper inflows. The air flows from the bottom to the top and prevents liquid from penetrating the sieve opening. Thus said liquid has to first reach the overflows before it can flow to the column plates lying beneath each overflow. Fluid columns form on each column plate and ensure intensive mass transfer. Having passed through the last column plate, the liquid reaches the column cone. The dealcoholised beer is periodically pumped out of the outflow in the tip of the cone into a storage tank and is gassed with $CO_2$.

(b) The Conditions and Results of the Experiment

The plant is operated under the following conditions:

| | |
|---|---|
| addition of krausen inactivaied in the usual way (content of original extract: 12%, real degree of fermentation: 8%) | 320 ml/l beer |
| flow temperature of the beer-reaction mixture (beer mixture/krausen mixture) | 20° C. |
| flow pressure of the beer-reaction mixture | 1 to 1.2 bar |
| temperature of the hot inflowing air | 170° C. |
| air flow rate (based on room temperature | 40 m³/h |
| flow rate of the beer-reaction mixture | 6 to 10 l/h |
| temperature of the beer-reaction mixture in the interfacial area | 37 to 40° C. |
| retention time of the beer-reaction mixture in the reactor | 12 mins at 8 l/h |

(c) Sensoric Evaluation of the Beer

The beer obtained by means of the continuous method was found to be definately better than the comparison beer. In several testing sessions, various charges of thus obtained alcohol-free and low-alcohol beer were compared to normal and alcohol-free commercial beer. The following basic observations were made:

The quality of the experimental beer comes very close to that of normal beer; on more than one occasion the low-alcohol beer was even thought to be the comparison beer or was rated higher.

The difference between the alcohol-free and the low-alcohol beer is very slight.

The commercial alcohol-free beer received a much poorer rating than the experimental beer.

EXAMPLE 2

The Desorption of Alcohol in a Continuous Process using Steam-Saturated Air

The sieve plate column plant described in Example 1 was converted for operation using water vapour-saturated air. For this mode of operation, isothermic conditions must be met: the steam-saturated air and the inflowing beer-reaction mixture must both have the same temperature. This temperature should also be essentially maintained during the process of desorption. If the air temperature - as in the experiments using unsaturated air - is kept very high in order to first heat the beer-reaction mixture to the desired reaction temperature, the air automatically cools down during the process and the steam condensates. This results in the finished beer leaving the reactor in a diluted state. On the other hand, if the temperature of the inflowing beer-reaction mixture is higher than that of the steam-saturated air, a certain loss of water is to be expected in the beer.

In order to bring about the isothermic conditions, the plant described in Example 1 was modified in the following fashion:

A flow heater was provided between the storage tank containing the cold beer-reaction mixture (krausen and final storage beer of a temperature of 2° to 3° C.) and the column in order to heat the flowing mixture to the reaction temperature.

Steam was lead out of a steam pot heated by a Bunsen burner and into the air flow. The steam content was controlled in such a way that the air was not only heated to the reaction temperature without it being necessary to use the heating aggregate, but was also saturated with steam.

In order to avoid the air cooling down in the afflux channel and the reaction mixture in the column, the exterior of these aggregates was insulated.

The water content of the input air was between 8 and 16 g/Nm$^3$ depending on the relative air humidity and the temperature. However, at a reaction temperature of 38° C. and complete saturation, the concentration is about 54 g/Nm$^3$ so that a water absorption rate of 38 to 46 g/Nm$^3$ is necessary. If 5.7 Nm of air per liter of bear-reaction mixture is to be treated, then the amount of water that has to be added is 217 to 262 ml. This amount of water corresponds exactly to the water desorption rate (evaporation rate) during operation using unsaturated air. This shows that if these conditions are met, selective dealcoholisation is the result: When the temperature was kept absolutely steady, the beer flowing out of the column had a loss in volume of only 3.5 to 4 % in comparison to the inflowing reaction mixture, and this loss was caused by the elimination of the alcohol.

The advantages of this method are that the dealcoholised beer does not have to be rediluted, and that the evaporation rate, essentially caused by the alcohol, does not impair the quality of the beer as the colloidal structure of the beer is not too greatly changed and the loss in aroma is reduced as a whole.

In addition to these advantages, this method also offers the opportunity of enriching or saturating the flow air with volatile aromatic substances for beer as well as saturating the flow air with water. This is done to ensure that the beer is kept from losing aroma in accordance with a theoretic state of equilibrium.

EXAMPLE 3

The process as described in Example 2 is repeated on an industrial scale in a plant having an output of 10 hl/h at 7100 Nm$^3$ of air. The temperature of the saturated air and the beer mixture is 40° C. In order to increase the extract content of the starting beer by 1.65 % by weight, krausen is added in the amount as given in Example 1.

EXAMPLE 4

A completely fermented Pilsner beer is dealcoholised and its taste harmonised in a reactor having the following features.

A double-walled vat being heated with warm water Circumference 600 mm Height 300 mm Toroid (doughnut) ventilating system.

The reactor is filled with batches of 21.25 liters of the beer to be treated, is mixed with yeast (S. rouxii, DSM 2531; $20 \times 10^6$ cells/ml) and aired with an air amount of approx. 30 m$^3$/h. The double-walling of the reactor and the preheated air keep the temperature of the also preheated beer to be treated and of the walls of the reactor at a constant 35° C.

After a ventilation time of 15 minutes, 3.75 liters of original wort, which has also been preheated to 35° C., having an original wort content of 12 % is added and ventilation is continued until the beer has an alcohol content of 0.0 % (approx. 75 minutes). The beer is then pumped off, cooled down to storing temperature, poured into a storing vessel, its original volume restored by adding carbonised water and recarbonised. After 3 to 4 days the beer is filtered and bottled.

The following data is obtained: The given percentages are percent by weight

|  | Starting Beer | Final Beer |  |
| --- | --- | --- | --- |
| Original wort (%) | 12 | 12 | (relating to fiscal law) |
| Real extract (%) | 4 | 5 | *1% fermentable extract |
| Apparent extract (%) | 2 | 5 |  |
| Alcohol (%) | 4 | 0 |  |

The sensoric difference between the starting beer and the final beer is only very slight.

EXAMPLE 5

Alcohol-free beer produced according to Example 4 is turned into low-alcohol beer according to the following process: 65 parts of the alcohol-free beer are blended with 35 parts of the starting beer used for producing the alcohol-free beer. This yields a blended beer having an alcohol content of approx. 1.4 % by weight. This beer, too, differs only slightly from the starting beer.

I claim:

1. A method for the production of alcohol free beer which comprises:
   (a) aerobically treating a yeast-containing alcoholic beer by leading a gas through said yeast-containing alcoholic beer which contains of from about 0.25 to 1.80% by weight of fermentable substances, in order to desorb said alcohol; and
   (b) carrying out said aerobic treatment and said desorption of said alcohol at a temperature of 25° C. to 50° C. until said fermentable substances are present in a residual amount of from about 0.1 to 0.5% by weight;

wherein said fermentable substances partially metabolize producing aromatic substances which give beer its taste and which compensates for the deficit of taste as a result of the removal of said alcohol.

2. The method according to claim 1, wherein said gas is lead through the alcoholic beer for 45 to 180 minutes in discontinuous treatment and for 5 to 20 minutes in continuous treatment.

3. The method according to claim 1, wherein partially fermented green beer is used.

4. The method according to claim 1, wherein completely fermented beer is used to which fermentable substances are added.

5. The method according to claim 4, wherein said fermentable substances are added to the beer either before or during the process of desorption.

6. The method according to claim 4, wherein said fermentable substance is either wort, krausen or sugar.

7. The method according to claim 6, wherein said fermentable substance is krausen.

8. The method according to claim 1, wherein said fermentable substances are used in an amount that leads to an increase in the extract content of the beer of 0.3 to 2.0 % by weight.

9. The method according to claim 1, wherein said desorption of said alcohol is carried out using a steam-saturated gas.

10. The method according to claim 9, wherein after removing said alcohol desorbed from said beer, said gas used to desorb said alcohol is recirculated for the further desorption of alcohol from said beer.

11. The method according to claim 1, wherein said desorption of said alcohol is carried out continuously.

12. The method according to claim 11, wherein said continuous desorption of the alcohol is carried out in a sieve plate column.

13. The method according to claim 1, wherein said yeast is of the Saccharomyces variety.

14. The method according to claim 13, wherein said yeast is Saccharomyces rouxii.

15. The method according to claim 14, wherein said yeast strain is Saccharomyces rouxii DSM 2531 or DSM 70535.

16. The method according to claim 1, wherein said beer contains a residual amount of said yeast used during the process of fermentation.

17. The method according to claim 16, wherein said beer is used which has a yeast cell content of 0.5 to $2 \times 10^6$ cells/ml.

* * * * *